United States Patent
Kobayashi et al.

[11] Patent Number: 5,924,629
[45] Date of Patent: Jul. 20, 1999

[54] EXPANSION VALVE

[75] Inventors: Kazuto Kobayashi; Masakatsu Minowa, both of Tokyo, Japan

[73] Assignee: Fujikoki Corporation, Tokyo, Japan

[21] Appl. No.: 08/927,268

[22] Filed: Sep. 11, 1997

[30]     Foreign Application Priority Data

Sep. 18, 1996  [JP]  Japan .................................. H8-246513

[51] Int. Cl.⁶ .................................................. F25B 41/04
[52] U.S. Cl. ..................................... 236/92 B; 219/137 R
[58] Field of Search ........................... 62/225; 236/92 B; 156/280; 219/137 R

[56]             References Cited

U.S. PATENT DOCUMENTS

| | | | |
|---|---|---|---|
| 2,152,781 | 7/1939 | Wile . | |
| 2,472,149 | 6/1949 | Dillman | 236/92 B |
| 4,143,790 | 3/1979 | Ueno et al. | 220/458 |
| 4,384,657 | 5/1983 | Ueno et al. | 220/458 |
| 4,499,136 | 2/1985 | Nakamura et al. | 428/206 |
| 4,735,835 | 4/1988 | Taira et al. | 428/35 |
| 4,935,080 | 6/1990 | Hassell et al. | 156/154 |
| 5,072,605 | 12/1991 | Imazu et al. | 72/46 |
| 5,228,588 | 7/1993 | Aizawa et al. | 220/458 |
| 5,249,447 | 10/1993 | Aizawa et al. | 72/46 |
| 5,303,864 | 4/1994 | Hirota | 236/92 B |

FOREIGN PATENT DOCUMENTS

| | | |
|---|---|---|
| 0 691 517 A1 | 1/1996 | European Pat. Off. . |
| 0 718 569 A1 | 6/1996 | European Pat. Off. . |
| 0718569A1 | 6/1996 | European Pat. Off. . |
| 2-254270 | 10/1990 | Japan . |
| 930725 | 7/1963 | United Kingdom . |

*Primary Examiner*—William E. Tapolcai
*Attorney, Agent, or Firm*—Foley & Lardner

[57]             ABSTRACT

An expansion valve has a housing with a hole extending through its outer wall. A plug body seals the hole after a heat sensing gas, which senses the temperature of the gas-phase refrigerant passing through the expansion valve, is pressurized in the housing through the hole. The plug body, which is made from a cut metallic material, seals the hole to maintain the pressurized gas in the housing. The plug body is welded to the housing by an electrical weld. A corrosion inhibitor can be applied around the weld periphery to prevent corrosion from forming at the weld areas. The plug body has a line contact portion formed by a tapered surface, e.g., a conical portion, with a plurality of concentrically arranged a line contact portion, which has spaced projections. These projections can be formed, for instance, by cutting circumferentially around the tapered surface. The spacings between the spaced projections form a plurality of weld areas that can securely seal the plug body at the line contact portion to the housing.

9 Claims, 3 Drawing Sheets

PRIOR ART

PRIOR ART

EXPANSION VALVE

TECHNICAL FIELD OF THE INVENTION

The present invention relates to expansion valves and, more particularly, to expansion valves applied to a refrigeration systems of air conditioners on vehicles and the like,

BACKGROUND OF THE INVENTION

FIG. 3 shows the prior art structure of an expansion valve placed inside a refrigeration cycle of an air conditioner on a vehicle. The expansion valve comprises a high-pressure refrigerant path 2 where the liquid refrigerant to be decompressed enters and a low-pressure refrigerant path 3 where the gas-phase refrigerant exist. The valve further has a valve hole 4 comprising a throttle hole with a small radius positioned on the high-pressure refrigerant path 2. Therefore, the liquid refrigerant flowing into the high-pressure refrigerant path 2 from a receiver tank 32 will experience adiabatic expansion by passing the valve hole 4 having a small flow area.

The open-hole portion of the refrigerant flow-in side of said valve orifice 4 is a valve seat. In this valve seat portion a ball-shaped valve means 5 is positioned to change the opening area of the valve orifice 4. The valve means 5 is supported by a ball receiver 7, and a compression coil spring 9 positioned between the ball receiver 7 and an adjusting nut 8 adds force to the valve means 5 toward the closing direction of the valve (pressing the valve means 5 into the valve seat portion of the valve orifice 4).

Reference 10 is a pressure housing positioned on the upper end of the valve body 1 for sensing the temperature of the gas-phase refrigerant and comprises a diaphragm 11 for driving the valve means 5 via an operation shaft 6, a sealed chamber 12 for holding the heat sensing gas partitioned by said diaphragm, and a pressure-equalizing chamber connecting to the low-pressure refrigerant path 3.

A hole 15 is placed on the outer wall 14 of said housing 10. When the heat sensing gas is filled from this hole into the sealed chamber, a metallic plug body 16 is utilized to seal the hole 15 on the outer wall, maintaining the pressure of the filled sensing gas.

Therefore, the sealed chamber 12 senses the temperature of the gas-phase refrigerant flowing through the low-pressure refrigerant path 3, and following the temperature change of the gas-phase refrigerant the pressure inside the sealed chamber 12 changes. On the other hand, the pressure-equalizing chamber 13 positioned on the lower stream of the diaphragm 11 is connected to the low-pressure refrigerant path 3 and has an equivalent pressure as the gas-phase refrigerant flowing through the low-pressure refrigerant path 3, so that the diaphragm 11 is displaced by the difference between the pressure inside the sealed chamber 12 and the pressure inside the pressure-equivalizing chamber 13. The displacement is transmitted via the operation shaft 6 to the valve means 5 and the opening of the valve orifice 4 is controlled.

The prior art expansion valves have the hole peripheral area of the housing outer wall 14 and the plug body 16 contacting each other by a tapered surface and welded together by an electrical resistance weld, for example, a projection weld. A concave portion is formed around this projection weld portion. To prevent water from gathering inside the concave portion, a projection 16a of the plug body 16 is inserted to the hole 15 on the outer wall of the housing, and the conical portion 16b of the plug body 16 is welded by a projection weld to form a projection weld portion 17, and the plug body 16 is welded to the outer wall 14 of the housing as is shown in FIG. 4. Then, a corrosion inhibitor 21 of an adhesive and the like is filled on the outer area. The expansion valve having such structure is shown in Japanese Patent Application Laid-Open No. H8-226567.

In these kinds of prior art expansion valves, the plug body 16 was welded only by projection weld on to the hole 15 on the outer wall of the housing, so the weld strength by the projection weld must be improved in order to perform the seal securely.

The present invention provides a heat expansion valve that improves the above-mentioned structure and enables a secure seal of the plug body to the hole on the outer wall of the housing by projection welding only, and at the same time prevents the corrosion of the peripheral of the projection weld on the outer w all of the housing.

SUMMARY OF THE INVENTION

In order to realize the above object, the expansion valve of the present invention comprises a valve body having a high-pressure refrigerant path for flowing a liquid-phase refrigerant to be decompressed and a low-pressure refrigerant path for flowing a gas-phase refrigerant and having a valve orifice formed inside the high-pressure refrigerant path, a valve means positioned close to the valve orifice of the valve body for changing the opening of the valve orifice, a pressure housing formed on the valve body for sensing the temperature of the gas-phase refrigerant having a diaphragm for driving the valve means for controlling the movement of the valve means, a sealed chamber partitioned by the diaphragm for filling a heat sensing gas, and a pressure-equalizing chamber connected to the low-pressure refrigerant path, and a plug body positioned inside a hole formed on an outer wall of the pressure housing to seal the heat sensing gas filled inside the sealed chamber.

According to the invention, the plug body has a line contact portion with a plurality of spaced projections formed around the contact portion. The spacings or cavities formed between the spaced projections form weld areas to securely seal the plug body to the housing. plug body can be body formed by a cutting process of a metallic material, and the projections in the circumference direction is formed by a cutting bite.

In the expansion valve of the present invention having the above-explained structure, a metallic material that went under a cutting process is used as a plug body. The tapered surface of the plug body and the peripheral portion of the hole formed on the outer wall of the housing are welded together by electrical resistance weld. Because the weld is performed on the cutting processed surface, the electrical resistance weld portion is formed on the cutting processed surface.

The expansion valve of the present invention further includes a plurality of line contact areas between the tapered surface of the plug body formed by a cutting process and the peripheral portion of the hole, so that a plurality of electrical resistance weld areas will be formed on the line contact portion. Therefore, the present invention provides an expansion valve that enables a secure seal of the heat sensing gas inside the pressure housing.

DETAILED DESCRIPTION OF THE PREFERRED EMBODIMENT

Figure 1:
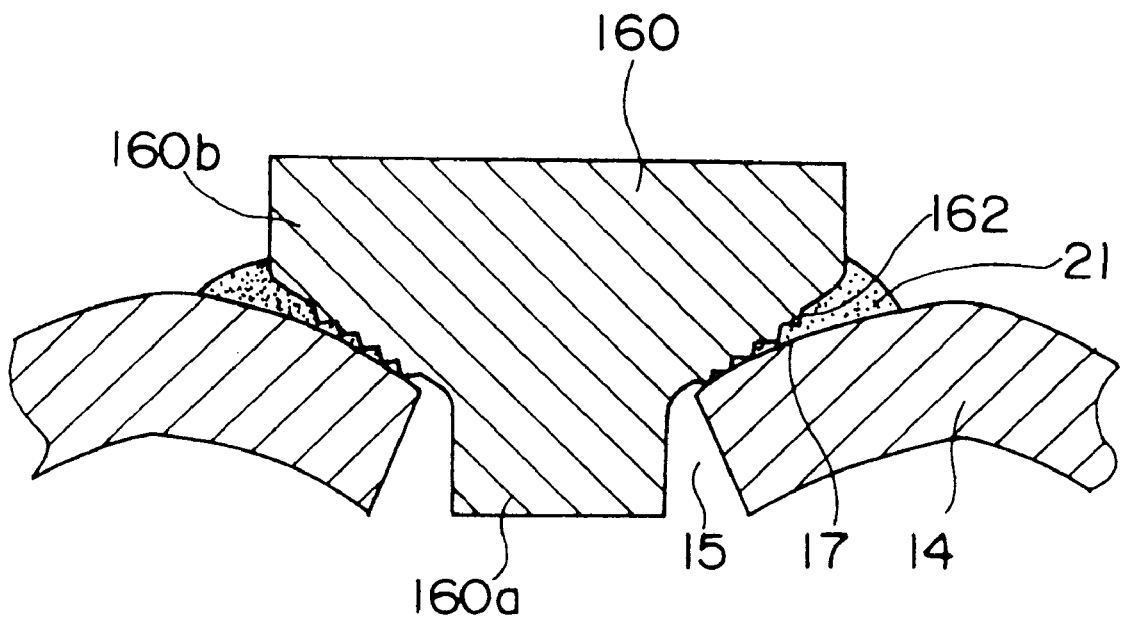
FIG. 1 is a vertical cross-sectional view showing the main portion of the expansion valve of one embodiment of the present invention.

One embodiment of the present invention will now be explained referring to the drawings.

Figure 2:
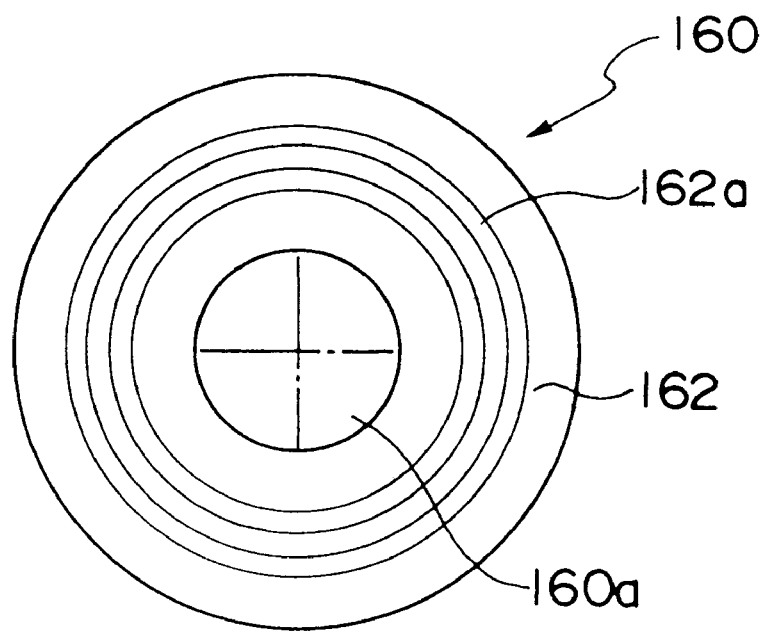
FIG. 2 shows the bottom view of the plug body of the embodiment of FIG. 1.

FIG. 1 is a vertical cross-sectional view of an embodiment of the main portion of the expansion valve of the present invention showing the state where a hole formed on the outer wall of the pressure housing is sealed by a plug body. FIG. 2 is a bottom view of the plug body shown in FIG. 1.

Figure 3:
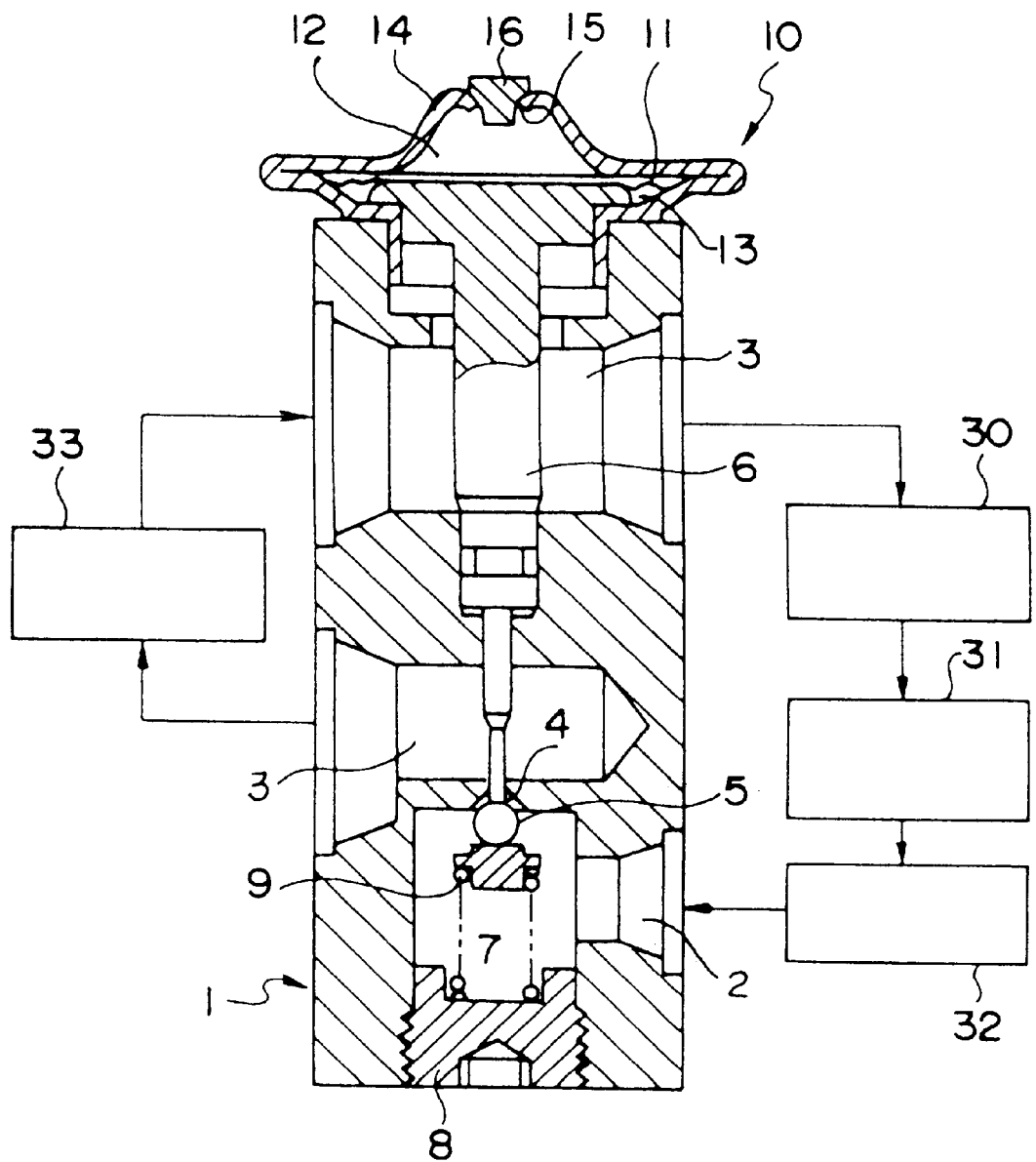
FIG. 3 shows the cross-sectional view of the expansion valve positioned inside the refrigeration cycle of the prior art.

It should be noticed that the structure of the expansion valve of the present invention is basically the same as the expansion valve shown in FIG. 3 except for the structure of the plug body for sealing the hole on the outer wall of the housing. Therefore, the same reference number shows either the same or equivalent element. As shown in FIG. 1 and FIG. 2, the plug body 160 is formed by a cutting process of a metallic material, such as stainless steel, and comprises a projection 160a to be inserted in to the hole 15 and a conical portion 160b with a tapered surface 162 formed thereto.

The tapered surface 162 is formed to have a taper angle in the range of practically 90 to 130 degrees. Then, the projection 160a of the plug body 160 is inserted to the hole 15 on the outer wall of the housing, and the tapered surface 162 of the conical portion 160b contacts the peripheral portion of the hole 15, the peripheral portion is formed to have a cross-section having a plurality of V-shaped (or tooth-like) projections (line contact portion) 162a, with a bottom portion having a slope with a tapered angle of about 120 degrees toward the center of the hole 15, and extending toward a lower diagonal direction of the hole. The contact surface of the peripheral portion of the hole 15 and the tapered surface 162 is formed to be in the range of 0.2 mm–1.5 mm. By performing a projection weld, for example, an electrical resistance weld, in such range, the hole 15 could be sealed only by projection weld keeping the state where the heat sensing gas is filled inside the housing . Therefore, a weld portion 17 is formed by projection welding of the cutting processed surface on the tapered surface 162 of the plug body 160 and the peripheral portion of the hole 15.

Further, the projections 162a are formed on the tapered surface 162 of the conical portion 160b in the circumferential direction of either the same circumference or with a lead.

These projections portion 162a in the circumference direction could be formed, for example, by a bite when performing the cutting process of the tapered surface 162.

The existence of the line contact projections 162a in the circumference direction forms the projection weld in a plurality of areas of the peripheral portion of the hole 15 on the outer wall 14 of the housing, and the weld portion 17 could be welded securely, thus improving the sealing character of the pressure housing.

Figure 4:
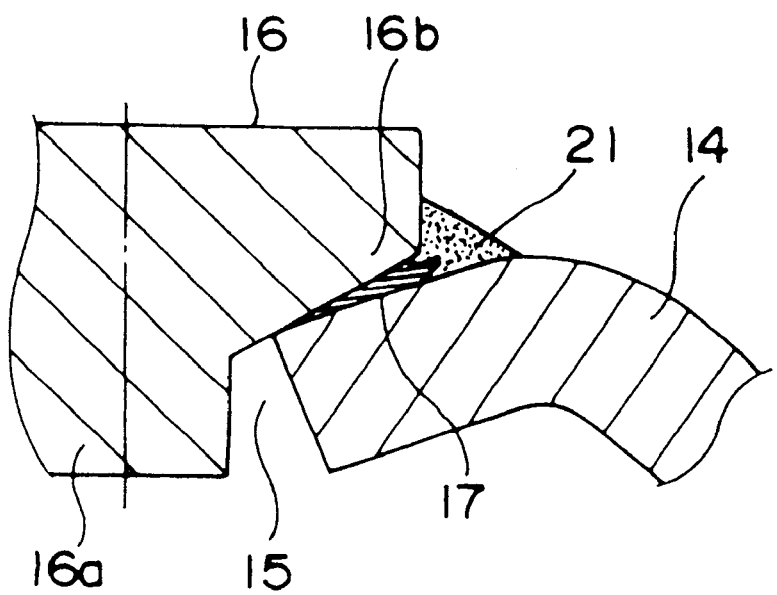
FIG. 4 shows the cross-sectional view showing the main portion of the expansion valve of the prior art.

Then, a concave formed in the peripheral of the projection weld portion 17 is filled with a corrosion inhibitor 21 for preventing rust, as was explained regarding FIG. 4.

The filling of the heat sensing gas to the sealed chamber of the housing 10 is performed in the below method.

The pressure housing 10 including an operation shaft 6 and a diaphragm 11 is held in a fixed state where the hole 15 on the outer wall of the housing is positioned facing upward between a metallic lower block and a non-metallic upper block. In this state, the air inside the inner space of the upper block is aspirated. The state inside the sealed chamber 12, therefore, will nearly be vacuum. Then, the heat sensing gas is injected and filled inside the sealed chamber.

Then, a movable plunger inside the upper block is pushed down, and the plug body 160 supported by the plunger is inserted to the hole 15 on the outer wall of the housing, and the conical portion 160b of the plug body 160 contacts the peripheral of the hole on the outer wall 14 of the housing. Then, a voltage for performing the projection weld is impressed to the plunger and the lower block, and the contact portion between the outer wall 14 of the housing and the plug body 160 is welded together keeping the state where the gas is being filled inside the sealed chamber.

Further, the operation of the expansion valve of the present invention comprising a pressure housing having a structure where the hole on the outer wall of the housing is sealed by a plug means shown in FIGS. 1 and 2 is the same as the operation of the expansion valves of the prior art shown in FIG. 3.

That is, the hole 15 formed on the outer wall 14 of the housing 10 is sealed by a metallic plug body 16 so as to keep the gas-filled state inside the housing. Therefore, a sealed chamber 12 senses the temperature of the gas-phase refrigerant flowing through a low-pressure refrigerant path 3, and the pressure inside the sealed chamber 12 changes according to the temperature change of the gas-phase refrigerant. On the other hand, a pressure-equalizing chamber positioned on the lower stream of a diaphragm 11 is connected to the low-pressure refrigerant path 3 and its pressure is the same as the pressure of the gas-phase refrigerant flowing through the low-pressure refrigerant path 3. Therefore, the diaphragm 11 is displaced according to the pressure difference between the pressure inside the sealed chamber and the pressure inside the pressure-equalizing chamber, and this movement is transmitted via a operation shaft 6 to a valve means 5, and thus controls the opening of the valve orifice 4.

Further, in the above embodiment, the plug body is formed by cutting a metallic material, but it can also be made by forging a metallic material and forming a line contact portion to the tapered surface of the plug body by using a mold.

The expansion valve of the present invention has a peripheral portion of a hole formed on an outer wall of a housing for filling a heat sensing gas into the housing and a plug body formed by cutting or forging a metallic material for sealing the hole, the contact portion of which are welded by electrical resistance weld to the cut or forged surface. By incorporating such structure, the seal of the hole by the plug body is secured by the electrical resistance weld, and the seal character of the housing is improved. Further, the peripheral of the welded portion on the outer wall of the housing is filled by a corrosion inhibitor to prevent water or vapor from gathering to the area, and

I claim:

1. An expansion valve comprising:
   a valve body having
      a high-pressure refrigerant path for communicating a liquid-phase refrigerant to be decompressed;
      a low-pressure refrigerant path for communicating a gas-phase refrigerant; and
      a valve orifice formed inside the high-pressure refrigerant path;

a valve positioned close to the valve orifice, the valve adapted to change an amount of opening of the valve orifice;

a housing having:
- a diaphragm for driving the valve to control the movement of the valve;
- a heat sensing gas holding chamber formed in the housing;
- an opening for introducing a heat sensing gas into the heat sensing gas holding chamber, the heat sensing gas being adapted to sense the temperature of the gas-phase refrigerant in the low-pressure refrigerant path formed on the valve body; and
- a pressure-equalizing chamber communicating with the low-pressure refrigerant path; and a plug body sealing the opening of the housing, the plug body being welded to the housing while the heat sensing gas is contained in the heat sensing gas holding chamber, the plug body having a line contact portion with a plurality of spaced projections formed thereon, wherein spacings between the spaced projections form a plurality of weld areas that securely seal the plug body at the line contact portion to the housing.

2. An expansion valve according to claim 1, wherein the projections are concentrically spaced.

3. An expansion valve according to claim 1, wherein the line contact portion is tapered.

4. An expansion valve according to claim 1, wherein the line contact portion is tapered at an angle of 90 to 130 degrees.

5. An expansion valve according to claim 1, further including a corrosion inhibitor that covers welding areas.

6. A plug for sealing an opening of a heat sensing gas chamber housing of an expansion valve while a heat sensing gas is contained in the heat sensing gas chamber housing by a weld, the plug body comprising:

a plug body having a line contact portion with a plurality of spaced projections formed thereon, wherein spacings between the spaced projections form a plurality of weld areas that securely seal the plug body at the line contact portion to the heat sensing gas chamber housing.

7. A plug according to claim 6, wherein the projections are concentrically spaced.

8. A plug according to claim 6, wherein the line contact portion is tapered.

9. A plug according to claim 6, wherein the line contact portion is tapered at an angle of 90 to 130 degrees.

* * * * *